US008365198B2

(12) United States Patent
Duffy

(10) Patent No.: US 8,365,198 B2
(45) Date of Patent: Jan. 29, 2013

(54) HANDLING EXCEPTIONS IN A DATA PARALLEL SYSTEM

(75) Inventor: John Duffy, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1052 days.

(21) Appl. No.: 12/330,718

(22) Filed: Dec. 9, 2008

(65) Prior Publication Data
US 2010/0146522 A1 Jun. 10, 2010

(51) Int. Cl.
*G06F 3/00* (2006.01)
*G06F 9/44* (2006.01)
(52) U.S. Cl. ........................................ 719/318; 717/127
(58) Field of Classification Search ................ 719/310, 719/318; 710/260; 717/127
See application file for complete search history.

(56) References Cited

U.S. PATENT DOCUMENTS

| 5,628,016 | A  | * | 5/1997  | Kukol ................................ 717/140 |
| 6,081,665 | A  | * | 6/2000  | Nilsen et al. ..................... 717/116 |
| 7,007,198 | B2 |   | 2/2006  | Boling |
| 7,669,193 | B1 | * | 2/2010  | Chipman ........................... 717/152 |
| 2003/0101380 | A1 |   | 5/2003  | Chaiken et al. |
| 2004/0268370 | A1 |   | 12/2004 | Mosier et al. |
| 2006/0101411 | A1 |   | 5/2006  | Selitrennikoff et al. |
| 2008/0288924 | A1 | * | 11/2008 | McAllister ........................ 717/127 |

OTHER PUBLICATIONS

S.Drew, Implementing Zero Overhead Exception Handling, 1995.*
"Exception Handling in Object Oriented Systems: Towards Emerging Application Areas and New Programming Paradigms", retrieved at <<homepages.cs.ncl.ac.uk/alexander.romanovsky/home.formal/EHOOS-report.pdf>>, Jul. 21, 2003, pp. 99.
Black, et al., "The Mach Exception Handling Facility", retrieved at <<http://64.233.167.104/search?q=cache:xkPPTX6wzK0J:ftp://ftp.cs.cmu.edu/project/mach/doc/unpublished/exception.ps+Synchronized+Exception+Unwind+for+Concurrent+Exception+Debugging&hl=en&ct=clnk&cd=1&gl=in>>, pp. 10.
Duffy, et al., "Running Queries on Multi-Core Processors", retrieved at <<msdn.microsoft.com/en-us/magazine/cc163329.aspx>>, pp. 8.
Caswell, et al., "Implementing a Mach Debugger for Multithreaded Applications", retrieved at <<citeseerx.ist.psu.edu/viewdoc/summary?doi=10.1.1.56.8758>>,Nov. 1989, pp. 14.
Pietrek, Matt, "A Crash Course on the Depths of Win32 Structured Exception Handling", retrieved at <<www.microsoft.com/msj/0197/exception/exception.aspx>>, pp. 18.
Buhr, et al., "μC++ Annotated Reference Manual", retrieved at <<plg.uwaterloo.ca/~usystem/pub/uSystem/uC++.pdf>>, pp. 197.

* cited by examiner

*Primary Examiner* — Lechi Truong

(57) ABSTRACT

A method of handling exceptions in a data parallel system includes forwarding exceptions thrown by concurrent worker tasks to a coordination task. The thrown exceptions are aggregated into an aggregation exception structure. It is determined whether the aggregation exception structure will be handled by an exception handler. The concurrent worker tasks are unwound when it is determined that the aggregation exception structure will be handled.

13 Claims, 3 Drawing Sheets

HANDLING EXCEPTIONS IN A DATA PARALLEL SYSTEM

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Data parallel systems typically operate by partitioning input data into disjoint subsets (partitions) so that independent concurrent tasks of execution operating on different threads may process the separate subsets in isolation. Exceptions that occur in concurrent tasks are caught and forwarded to a coordination task. These exceptions are then aggregated into an aggregation structure, such as an aggregate exception object, and re-thrown by the coordination task. The aggregation structure may then be caught and the individual exceptions inside handled by the program.

In one embodiment, handling of exceptions in a data parallel system includes forwarding exceptions thrown by concurrent worker tasks to a coordination task. The thrown exceptions are aggregated into an aggregation exception structure. It is determined whether the aggregation exception structure will be handled by an exception handler. The concurrent worker tasks are unwound when it is determined that the aggregation exception structure will be handled. The concurrent worker tasks are prevented from unwinding when it is determined that the aggregation exception structure will not be handled.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
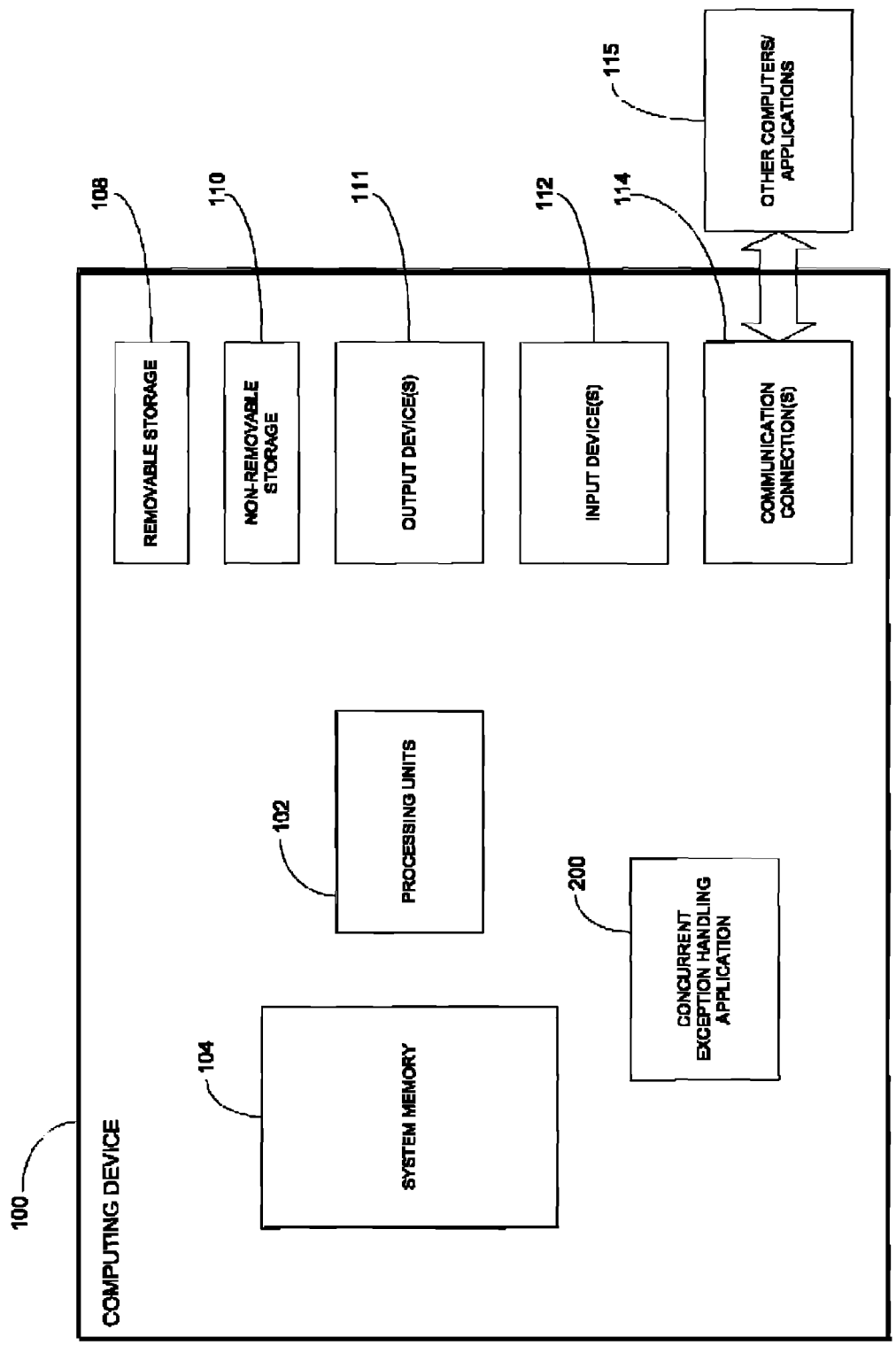
FIG. 1 is a diagram illustrating a computing system suitable for performing concurrent exception handling according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a concurrent exception handler application, but the technologies and techniques described herein also serve other purposes in addition to these. In one implementation, one or more of the techniques described herein can be implemented as features within a framework program such as MICROSOFT®.NET Framework, or within any other type of program or service.

A call stack consists of a set of stack frames, one for each procedure invocation, where each stack frame includes information about the parameters, local and temporary variables, and enough program state to resume execution when a procedure returns. During runtime, a typical stack frame is created and pushed onto the call when a procedure is called, and then popped or removed from the call stack when the associated procedure exits. The call stack therefore, represents a structure of dynamically nested procedures that are active within the execution of the program at any given time.

When an improper event or error arises during execution of a program, an exception may be signaled from within the executing procedure. Exception handling often involves the ability to remove or "unwind" a number of frames from the call stack in order to transfer control to an exception handling procedure that may have been further down on the stack. Stack unwinding in the presence of an exception involves the process of removing the stack frames from the call stack one at a time until a stack frame is encountered that represents a procedure that is willing to handle the exception.

Exception handling and stack unwinding can be more complex in a data parallel system. Data parallel systems typically operate by partitioning input data into disjoint subsets (partitions) so that independent concurrent tasks of execution operating on different threads may process the separate subsets in isolation. In one embodiment, exceptions that occur in concurrent tasks are caught and forwarded to a coordination task. These exceptions are then aggregated into an aggregation structure, such as an aggregate exception object, and re-thrown by the coordination task. The aggregation structure may then be caught and the individual exceptions inside handled by the program.

In one embodiment, exceptions are handled in a program once all concurrent tasks have completed. A coordination task initializes a shared flag and a shared list of exceptions to be aggregated. Concurrent worker tasks are started, and when one throws an exception, the shared flag is set and the exception is forwarded to the coordination task and added to the shared list. The worker tasks each poll the flag to determine whether it has been set, and voluntarily terminate when the flag is set. If any additional exceptions occur on concurrent tasks before they are able to voluntarily terminate, those additional exceptions are added to the shared list. After all of the concurrent worker tasks terminate, an aggregate exception object is created by the coordination task containing references to each of the exceptions in the shared list, and then the aggregate exception object is thrown by the coordination task.

After an aggregate exception object is thrown according to one embodiment, the object is caught by a catch handler. The catch handler supplies one or more exception handler functions, each of which includes an exception type and a handler function. For each of the exceptions in the aggregate exception object, the system determines if the exception is one of the types handled by the handler functions. If it is, the particular handler is run and the exception is marked as handled. Once all of the exceptions are processed to see if there are handlers, the system determines if any unhandled exceptions are still present. If one exception remains, then the system re-throws the specific exception. If more than one exception remains, a new aggregate exception object is constructed that includes the remaining unhandled exceptions, and the new aggregate exception object is thrown.

When concurrent exceptions are thrown in a data parallel system, the debugging experience can be poor. This applies to both handled exceptions (when a debugging session is active) and unhandled exceptions (when a debugger may be active or attached once the process crashes). The reason this experience may be poor is that, as discussed above, exceptions may be marshaled across threads automatically, so when a programmer looks in the debugger, the programmer will see thread-local state associated with the wrong thread, and (for unhandled exceptions) the actual stack for the thread that threw the exception, including important local variable state, may have gone away. For example, consider the following Pseudo Code Example I:

PSEUDO CODE EXAMPLE I

Parallel.For(0, N, i=> . . . possibly throw an exception . . . );

The Parallel.For construct in Example I schedules iterations to run concurrently, but otherwise provides a synchronous appearance to the users of the Parallel.For itself. It does this by working with a scheduler component (coordination task) to multiplex iterations onto multiple scheduler-managed threads (concurrent worker tasks). If an iteration throws an exception that escapes, the Parallel.For construct will automatically propagate the exception (e.g., to preserve the synchronous appearance). If this exception goes unhandled on this thread too, it may crash the process. In response, a programmer may attach a debugger to try and determine the root cause. But the thread and associated stack used for " . . . possibly throw an exception . . . " will have been given back to the scheduler responsible for executing iterations. This makes identification of the root cause difficult. It also means crash dumps will have less information, because the stack state may or may not be preserved, and can be hard to find.

Structured exception handling (SEH), which is a Windows exception handling mechanism that both Visual C++ and Microsoft .NET Common Language Runtime (CLR) exceptions are built on top of, executes two passes or phases when an exception occurs: (1) a search pass; and (2) an unwind pass. In the first pass, the current stack is searched for an appropriate handler, which involves checking the type of the exception against the catch clause types and, in some cases (like C++ and Visual Basic), executing predicate-based exception filters. If no user-mode handler was found, the default operating system exception filter sitting at the top of all thread stacks will take action. If a debugger is attached, it is notified of the unhandled exception. Otherwise, the standard "Unhandled Exception" dialog is shown that allows a user to crash the process, attach a debugger, and/or capture a crash dump. In the second pass, the stack is actually unwound to the point of catch, and the handler is executed. During the process of unwinding, any finally blocks on the thread's stack are run. One embodiment interacts with a two-pass structured exception handling system. In one embodiment, the exception handling system provides notifications during the search phase. For example, notifications may occur when a handler is found for an exception or when it is determined that no handler exists.

One way of communicating errors out of a Parallel.For loop is to aggregate all exceptions that have occurred on all iterations of the loop. When an exception occurs in some iteration, i, the exception is stored in a shared list that is shared among all iterations. A flag is set to indicate to all other iterations that they should voluntarily quit. Because of the presence of concurrency, more than one iteration could throw an exception (hence the list of exceptions). Once all iterations are accounted for and have quit running, the Parallel.For application programming interface (API) then throws a new aggregate exception, which is comprised of the aggregate of all other exceptions. In one embodiment, this works by actually unwinding the concurrent worker thread stacks. In one embodiment, there is code inside the Parallel.For construct as shown in the following Pseudo Code Example II:

PSEUDO CODE EXAMPLE II

```
public static void Parallel.For(int from, int to, Action<int> body) {
    bool failed = false;
    List<Exception> exceptions = new List<Exception>( );
    // Create one or more tasks:
    Task t = Task.Create(..., delegate {
        try {
            for (... some subrange ...) {
                if (failed) break;
                body(...);
            }
        } catch (Exception e) { // backstop all!
            lock (exceptions) { exceptions.Add(e); }
            failed = true;
        }
    });
    t.Wait( );
    // If exceptional, propagate:
    if (exceptions.Count > 0)
        throw new AggregateException(exceptions);
}
```

The "try" block in Example II defines the scope for an exception handler (i.e., the try block encloses the statements that may throw an exception), and the scope ends with the start of the first handler block (i.e., indicated by "catch"). A related "finally" clause may also be included that is executed whether an exception occurred or not. Notice that exceptions in Example II are explicitly marshaled from the inner task(s) out to the call to Parallel.For, and that this is done by letting the task's stack fully unwind before marshaling. To illustrate an issue that arises with this unwinding, consider the code in the following Pseudo Code Example III:

PSEUDO CODE EXAMPLE III

```
Parallel.For(0, N, i => {
    int x = i + ... read some state ...;
    if (x > 33 && x < 99) throw new FooException( );
    ...
});
```

Assume that some iteration in Example III throws a FooException, and that this is thrown because of some state seen in "... read some state..." and a predicate based on "x". If the stack variable, x, was still available to inspect, it could be determined why the task threw an exception. However, because the thread's stack was unwound, this information is gone, which makes both interactive debugging and crash dump analysis difficult.

One solution to this issue is to just let exceptions escape Parallel.For as unhandled. However, this does not preserve the attractive quality of the Parallel.For behaving like a sequential For loop. It would also force developers to build their own variant of this, without all of the runtime support provided by embodiments set forth herein.

One embodiment provides a concurrent exception handler application that uses a structured exception handling (SEH) two-pass model to keep stacks around long enough for debugging, and provides interoperability with the stack unwind mechanism to free up stacks as quickly as possible. One embodiment of the concurrent exception handler provides the ability to crash a thread on which an exception actually occurred, as opposed to the thread the exception got marshaled to, in order to provide good debugging and crash dumps. In one embodiment, the concurrent exception handler provides the ability to nest arbitrary numbers of asynchronous exception marshaling points.

FIG. 1 is a diagram illustrating a multi-processor computing device 100 suitable for performing concurrent exception handling according to one embodiment. In the illustrated embodiment, the computing system or computing device 100 includes a plurality of processing units (e.g., processors or threads) 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a concurrent exception handling application 200. Concurrent exception handling application 200 is described in further detail below with reference to FIG. 2.

Figure 2:
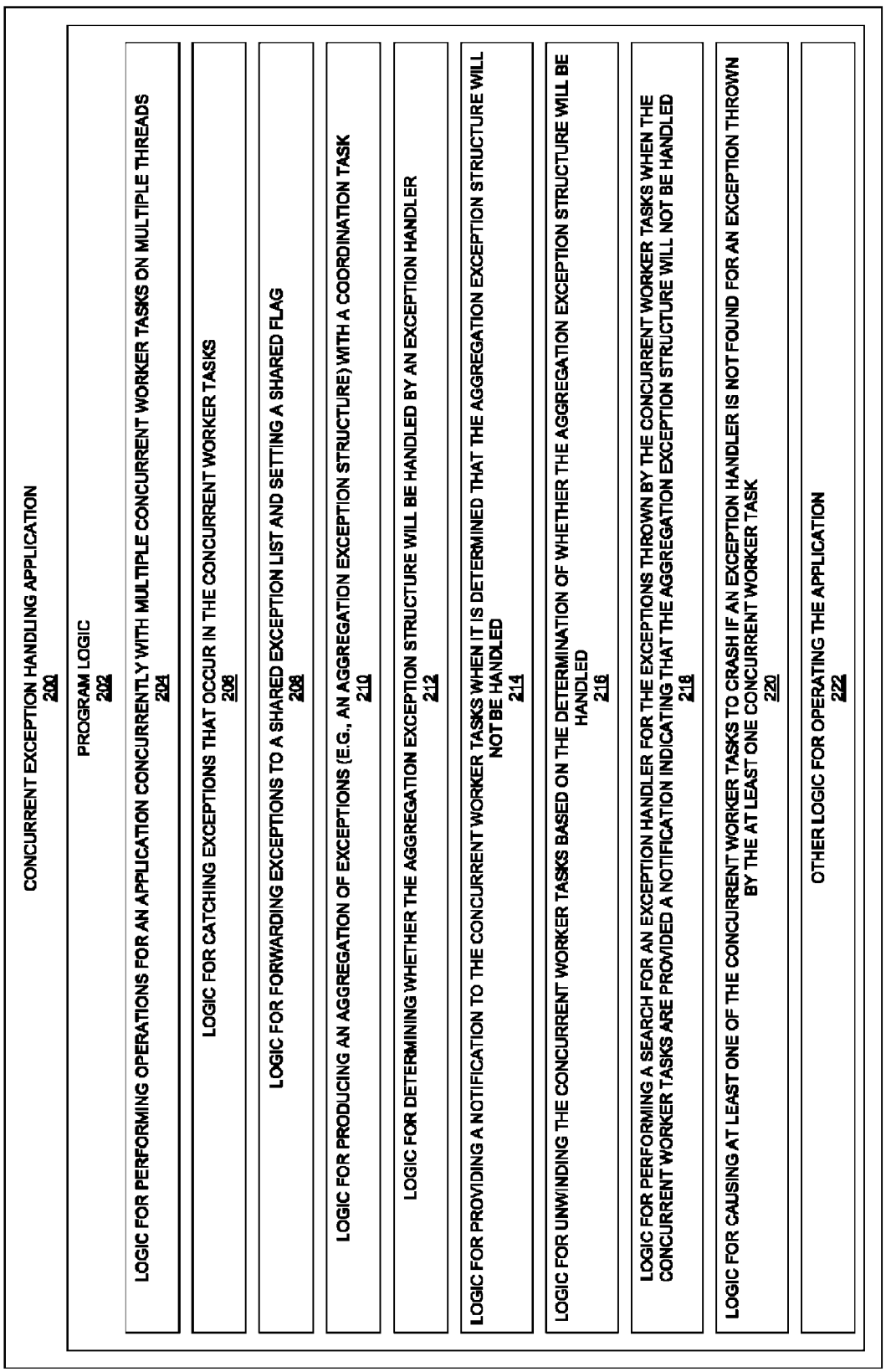
FIG. 2 is a diagrammatic view of a concurrent exception handling application for operation on the computer system illustrated in FIG. 1 according to one embodiment.

FIG. 2 is a diagrammatic view of one embodiment of a concurrent exception handling application 200 for operation on the computing device 100 illustrated in FIG. 1. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Concurrent exception handling application 200 includes program logic 202, which is responsible for carrying out some or all of the techniques described herein. Program logic 202 includes logic 204 for performing operations for an application concurrently with multiple concurrent worker tasks on multiple threads; logic 206 for catching exceptions that occur in the concurrent worker tasks; logic 208 for forwarding exceptions to a shared exception list and setting a shared flag; logic 210 for producing an aggregation of exceptions (e.g., an aggregation exception structure) with a coordination task; logic 212 for determining whether the aggregation exception structure will be handled by an exception handler; logic 214 for providing a notification to the concurrent worker tasks when it is determined that the aggregation exception structure will not be handled; logic 216 for unwinding the concurrent worker tasks based on the determination of whether the aggregation exception structure will be handled; logic 218 for performing a search for an exception handler for the exceptions thrown by the concurrent worker tasks when the concurrent worker tasks are provided a notification indicating that the aggregation exception structure will not be handled; logic 220 for causing at least one of the concurrent worker tasks to crash if an exception handler is not found for an exception thrown by the at least one concurrent worker task; and other logic 222 for operating the application.

Figure 3:
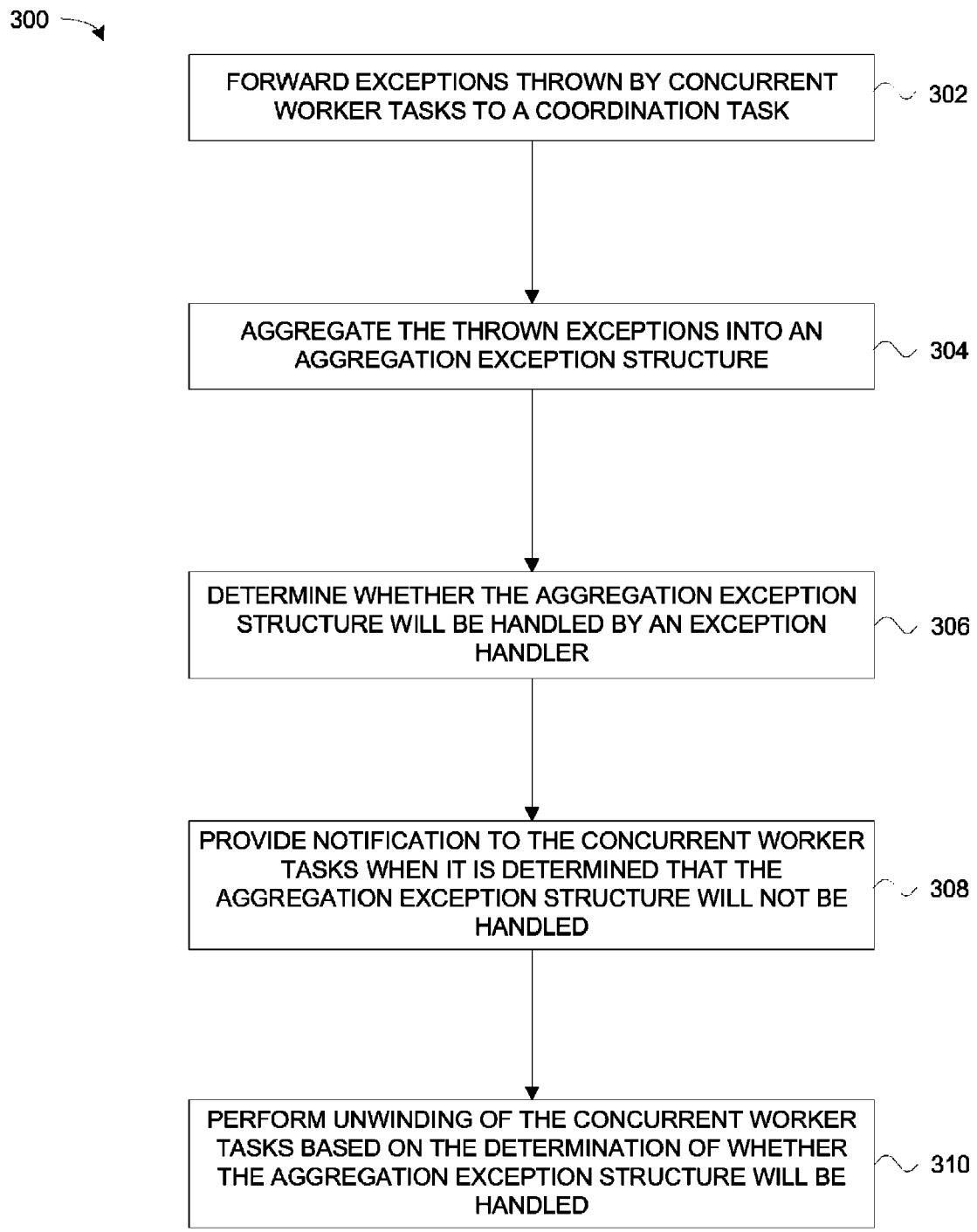
FIG. 3 is a flow diagram illustrating a method of handling exceptions in a data parallel system according to one embodiment.

Turning now to FIG. 3, techniques for implementing one or more embodiments of concurrent exception handling application 200 are described in further detail. In some implementations, the techniques illustrated in FIG. 3 are at least partially implemented in the operating logic of computing device 100.

FIG. 3 is a flow diagram illustrating a method 300 of handling exceptions in a data parallel system according to one embodiment. At 302 in method 300, exceptions thrown by concurrent worker tasks are forwarded to a coordination task. At 304, the thrown exceptions are aggregated into an aggregation exception structure. At 306, it is determined whether the aggregation exception structure will be handled by an exception handler. At 308, a notification is provided to the concurrent worker tasks when it is determined at 306 that the aggregation exception structure will not be handled. The concurrent worker tasks block in one embodiment after throwing an exception until the notification is provided to the concurrent worker tasks at 308. At 310, unwinding of the concurrent worker tasks is performed based on the determination at 306 of whether the aggregation exception structure will be handled. In one embodiment, the concurrent worker tasks are unwound at 310 when it is determined at 306 that the aggregation exception structure will be handled. In one embodiment, the system prevents unwinding of the concurrent worker tasks when it is determined at 306 that the aggregation exception structure will not be handled.

In one embodiment, a search is performed for an exception handler for the exceptions thrown by the concurrent worker tasks when the concurrent worker tasks are provided the notification at 308. At least one of the concurrent worker tasks is caused to crash in one embodiment if an exception handler is not found for an exception thrown by the at least one concurrent worker task. In one embodiment, the concurrent worker tasks in method 300 are each configured to terminate upon an exception being thrown by the concurrent worker tasks, and the aggregation exception structure is thrown by the coordination task after the concurrent worker tasks have been terminated. In one embodiment, the forwarding (302), aggregating (304), determining (306), and notifying (308) steps in method 300 occur during a first pass of a two-pass structured exception handling system, and the unwinding (310) occurs in a second pass of the two-pass structured exception handling system.

In one embodiment, the aggregate exception structure in method 300 is an aggregate exception object that is configured to store multiple exceptions and related details, such as stack trace, thread ID, and/or API specific information about the concurrent operation that threw the forwarded exception to help in debugging.

A feature of one embodiment is to avoid unwinding threads until it is known whether an exception will go unhandled. In one embodiment, parallel methods, such as Parallel.For, are provided with an exception filter surrounding all task invokes, similar to the "catch" given in Pseudo Code Example II. This filter according to one embodiment operates on all exception kinds, and communicates with the Parallel.For substrate. Pseudo code for implementing such a filter according to one embodiment is given in the following Pseudo Code Example IV:

PSEUDO CODE EXAMPLE IV

```
class UnhandledExceptionRecord {
    ManualResetEvent _mreThrow = new ManualResetEvent(false);
    ManualResetEvent _mreUnwind = new ManualResetEvent(false);
    Exception _e = ...;
    bool _handled = false;
}
UnhandledExceptionRecord uer = null;
try {
    body(...)
} filter (Exception e) {
    uer = new UnhandledExceptionRecord(e);
    // tell the consumer we threw.
    RegisterUER(uer);
    // wait for acknowledgement.
    uer._mreThrow.WaitOne( );
    if (uer._handled) {
        // must unwind.
        return EXCEPTION_EXECUTE_HANDLER;
```

-continued

```
    } else {
        // unhandled ... let it bomb the thread.
        return EXCEPTION_CONTINUE_SEARCH;
    }
} catch (Exception e) {
    // notify the other thread to continue its unwind.
    uer._mreUnwind.Set( );
}
```

In one embodiment, concurrent exceptions are handled in the following manner: (1) a filter is provided at the top of each task invoke; (2) in the first pass, an unhandled exception thrown by a concurrent worker thread is communicated to the coordination thread (e.g., Parallel.For, Parallel.Do, PLINQ query, state on a raw Task itself, etc); (3) the worker thread that threw the exception blocks until notified by the coordination thread consuming the exception (in one embodiment, a timeout is provided here that logs debugger entries if the exception was never found (since it disappeared); (4) when the coordination thread notices the exception, the orchestrating thread performs its own stack unwind, sets the_handled flag in Pseudo Code Example IV to true or false, and signals "mreThrow" in Example IV to wake up the throwing worker thread; (5) when the throwing worker thread wakes back up, it checks the_handled flag; if it is true, the throwing thread returns EXCEPTION_EXECUTE_HANDLER to allow the second pass of the structured exception handling system to kick in and unwind the thread (the exception will be handled elsewhere, so the current thread can be safely unwound); (6) if the_handled flag is false, the throwing thread returns EXCEPTION_CONTINUE_SEARCH, which will continue the search on up to the OS base filter, which will allow a debugger attach on the thread that actually threw the exception. No marshaling occurs in one form of this embodiment, and the stack of the throwing thread is preserved.

One embodiment provides interoperability with a conventional two-pass structured exception handling (SEH) system. In one embodiment, AggregateException in Pseudo Code Example II will hold a list of UnhandledExceptionRecords (Pseudo Code Example IV). The exception system according to one embodiment is made aware of this kind of exception in the first pass in two specific places: (1) If this kind of exception is handled, "_handled" in Pseudo Code Example IV is set true on all records, the "_mreThrow" event in Example IV is set, and waiting on "_mreUnwind" is performed to ensure that all throwing stacks have unwound before the consumer stack is unwound; (2) If the exception goes completely unhandled, "_handled" in Pseudo Code Example IV is set false on all records, the "_mreThrow event" in Example IV is set, and waiting on "_mreUnwind" is not performed because one of the other threads will crash. In one embodiment, waiting is performed with a small timeout in case another thread hangs, letting this thread crash if the other threads do not get around to it.

One embodiment provides marshaling across multiple boundaries, such as for the case of a nested Parallel.For like that shown in the following Pseudo Code Example V:

PSEUDO CODE EXAMPLE V

```
Parallel.For(0, N, i =>
    Parallel.For(0, M, j => ...)
);
```

To implement this marshaling according to one embodiment, the filter in Pseudo Code Example IV is configured to recognize "AggregateException". A new "UnhandledExceptionRecord" is generated and used to marshal to a caller. The "_handled" flag is propagated to all records within such an exception, and each of the "_mreThrow" events is set. In the case of the exception being unhandled, "EXCEPTION_CONTINUE_SEARCH" is not returned, because the throwing threads will do that. In one embodiment, waiting is performed on "_mreUnwind" with a small timeout.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of handling exceptions in a data parallel system, comprising:
   forwarding exceptions thrown by concurrent worker tasks to a coordination task;
   aggregating the thrown exceptions into an aggregation exception structure;
   determining whether the aggregation exception structure will be handled by an exception handler; and
   unwinding the concurrent worker tasks when it is determined that the aggregation exception structure will be handled;
   preventing unwinding of the concurrent worker tasks when it is determined that the aggregation exception structure will not be handled;
   providing a notification to the concurrent worker tasks when it is determined that the aggregation exception structure will not be handled;
   searching for an exception handler for the exceptions thrown by the concurrent worker tasks when the concurrent worker tasks are provided the notification.

2. The method of claim 1, wherein the concurrent worker tasks block after throwing an exception until the notification is provided to the concurrent worker tasks.

3. The method of claim 1, and further comprising: causing at least one of the concurrent worker tasks to crash if an exception handler is not found for an exception thrown by the at least one concurrent worker task.

4. The method of claim 1, and further comprising:
   terminating the concurrent worker tasks;
   throwing the aggregation exception structure with the coordination task after the concurrent worker tasks have terminated.

5. The method of claim 1, wherein the forwarding, aggregating, and determining occur during a first pass of a two-pass structured exception handling system.

6. The method of claim 5, wherein the unwinding occurs during a second pass of the two-pass structured exception handling system.

7. A computer-readable storage medium storing computer-executable instructions for performing a method, comprising:
   forwarding exceptions thrown by concurrent worker tasks to a coordination task;
   aggregating the thrown exceptions into an aggregation exception structure;
   determining whether the aggregation exception structure will be handled by an exception handler; and
   performing unwinding of the concurrent worker tasks based on the determination of whether the aggregation exception structure will be handled;
   unwinding the concurrent worker tasks when it is determined that the aggregation exception structure will be handled; and
   preventing unwinding of the concurrent worker tasks when it is determined that the aggregation exception structure will not be handled;
   providing a notification to the concurrent worker tasks when it is determined that the aggregation exception structure will not be handled;
   searching for an exception handler for the exceptions thrown by the concurrent worker tasks when the concurrent worker tasks are provided the notification.

8. The computer-readable storage medium of claim 7, wherein the concurrent worker tasks block after throwing an exception until the notification is provided to the concurrent worker tasks.

9. The computer-readable storage medium of claim 7, wherein the method further comprises:
   searching for an exception handler for the exceptions thrown by the concurrent worker tasks when the concurrent worker tasks are provided the notification.

10. The computer-readable storage medium of claim 9, wherein the method further comprises:
    causing at least one of the concurrent worker tasks to crash if an exception handler is not found for an exception thrown by the at least one concurrent worker task.

11. The computer-readable storage medium of claim 7, wherein the method further comprises:
    terminating the concurrent worker tasks;
    throwing the aggregation exception structure with the coordination task after the concurrent worker tasks have terminated.

12. The computer-readable storage medium of claim 7, wherein the forwarding, aggregating, and determining occur during a first pass of a two-pass structured exception handling system.

13. The computer-readable storage medium of claim 12, wherein the unwinding occurs during a second pass of the two-pass structured exception handling system.

* * * * *